United States Patent
Watarai

(10) Patent No.: US 9,283,815 B2
(45) Date of Patent: Mar. 15, 2016

(54) BICYCLE WHEEL

(75) Inventor: Etsuyoshi Watarai, Sakai (JP)

(73) Assignee: Shimano Inc., Osaka (JP)

( * ) Notice: Subject to any disclaimer, the term of this patent is extended or adjusted under 35 U.S.C. 154(b) by 375 days.

(21) Appl. No.: 13/542,348

(22) Filed: Jul. 5, 2012

(65) Prior Publication Data

US 2014/0007998 A1    Jan. 9, 2014

(51) Int. Cl.
| | |
|---|---|
| B60C 15/02 | (2006.01) |
| B60B 21/12 | (2006.01) |
| B60C 15/028 | (2006.01) |
| B60C 17/06 | (2006.01) |
| B60C 5/02 | (2006.01) |
| B60B 21/06 | (2006.01) |

(52) U.S. Cl.
CPC ............ *B60C 15/0209* (2013.01); *B60B 21/125* (2013.01); *B60C 5/02* (2013.01); *B60C 15/022* (2013.04); *B60C 15/028* (2013.01); *B60C 17/06* (2013.01); *B60B 21/068* (2013.01); *B60B 2900/731* (2013.01); *B60C 2200/12* (2013.04)

(58) Field of Classification Search
CPC ............ B60C 15/0209; B60C 15/0213; B60C 15/028; B60C 17/04; B60C 17/06
USPC ................. 152/379.3, 381.3–381.6, 516, 520
See application file for complete search history.

(56) References Cited

U.S. PATENT DOCUMENTS

| | | | | |
|---|---|---|---|---|
| 779,505 | A * | 1/1905 | Steiner | 152/400 |
| 1,538,202 | A * | 5/1925 | Moore | 152/400 |
| 1,614,286 | A * | 1/1927 | Cullen | 152/400 |
| 1,621,021 | A * | 3/1927 | Medynski | 152/400 |
| 2,109,383 | A * | 2/1938 | Gallardo | 152/453 |
| 3,965,957 | A * | 6/1976 | Nakasaki | 152/400 |
| 4,016,917 | A * | 4/1977 | Victor | 152/381.3 |
| 4,681,147 | A * | 7/1987 | Hugele | 152/158 |
| 5,060,706 | A * | 10/1991 | Jones et al. | 152/381.5 |
| 5,679,184 | A | 10/1997 | Hosking | |
| 6,896,020 | B1 * | 5/2005 | Summers | 152/334.1 |
| 7,445,034 | B1 * | 11/2008 | Huang | 152/381.5 |
| 2005/0161138 | A1 * | 7/2005 | Yukawa et al. | 152/450 |

FOREIGN PATENT DOCUMENTS

| | | |
|---|---|---|
| JP | 2006-143187 A | 6/2006 |
| JP | 2011-143874 A | 7/2011 |

* cited by examiner

*Primary Examiner* — Jason Bellinger
(74) *Attorney, Agent, or Firm* — Global IP Counselors

(57) ABSTRACT

A bicycle wheel includes a rim, a tire and a tire retainer. The rim has an annular bridge and a pair of annular flanges with tire retaining ridges. The annular flanges extend outward from the annular bridge to define an annular space. The tire has a pair of annular bead portions that are engaged with the tire retaining ridges of the rim, respectively. The tire retainer is disposed within the annular space. The tire retainer has a support body that is disposed between the bead portions of the bicycle tire. The support body has an axial width that is dimensioned such that the bead portions of the bicycle tire are prevented from disengaging from the tire retaining ridges of the wheel rim, respectively, while the bicycle tire is disposed in the annular space.

14 Claims, 9 Drawing Sheets

BICYCLE WHEEL

BACKGROUND

1. Field of the Invention

This invention generally relates to a bicycle wheel. More specifically, the present invention relates to a bicycle wheel having a tire retainer for preventing a clincher tire from disengaging from a rim, even if the tire is punctured.

2. Background Information

There are many different types of bicycle wheels, which are currently available on the market. Most bicycle wheels have a hub, a plurality of spokes and an annular rim. The hub is attached to a part of the frame of the bicycle for relative rotation. The inner ends of the spokes are coupled to the hub and extend outwardly from the hub. The annular rim is coupled to the outer ends of the spokes and has an outer portion for supporting a pneumatic tire thereon. Typically, the spokes of the bicycle wheel are thin metal wire spokes.

Generally speaking, there are two main types of bicycle rims. The first main type of a bicycle rim is called a clincher type rim in that the rim has flanges that define annular grooves such that a wire or aramid (Kevlar) fiber bead of a tire interlocks with flanges in the rim. The above types of wheels have been, designed for use with tube tires or tubeless tires. Typically, tubeless tire wheels have an annular seal arranged to seal the spoke attachment openings of the rim. The second main type of a bicycle rim is called a tubular or sew-up rim. In tubular or sew-up rims, a tubular tire with a torus shaped is attached to the rim with adhesive. The tire engagement area of the rim is often provided with a shallow concave cross section in which the tire lies instead of flanges on which tire beads seat.

SUMMARY

Generally, the present disclosure is directed to various features of a tire retainer for preventing a clincher tire from disengaging from a rim, even if the tire is punctured.

In view of the state of the known technology, a bicycle wheel is provided that basically comprises a wheel rim, a bicycle tire and a tire retainer. The rim has an annular bridge and a pair of annular flanges with tire retaining ridges. The annular flanges extend outward from the annular bridge to define an annular space. The tire has a pair of annular bead portions that are engaged with the tire retaining ridges of the rim, respectively. The tire retainer is disposed within the annular space. The tire retainer has a support body that is disposed between the bead portions of the bicycle tire. The support body has an axial width that is dimensioned such that the bead portions of the bicycle tire are prevented from disengaging from the tire retaining ridges of the wheel rim, respectively, while the bicycle tire is disposed in the annular space.

Other objects, features, aspects and advantages of the disclosed a bicycle wheel will become apparent to those skilled in the art from the following detailed description, which, taken in conjunction with the annexed drawings, discloses preferred embodiments of the bicycle wheel.

BRIEF DESCRIPTION OF THE DRAWINGS

Referring now to the attached drawings which form a part of this original disclosure.

DETAILED DESCRIPTION OF EMBODIMENTS

Figure 1:
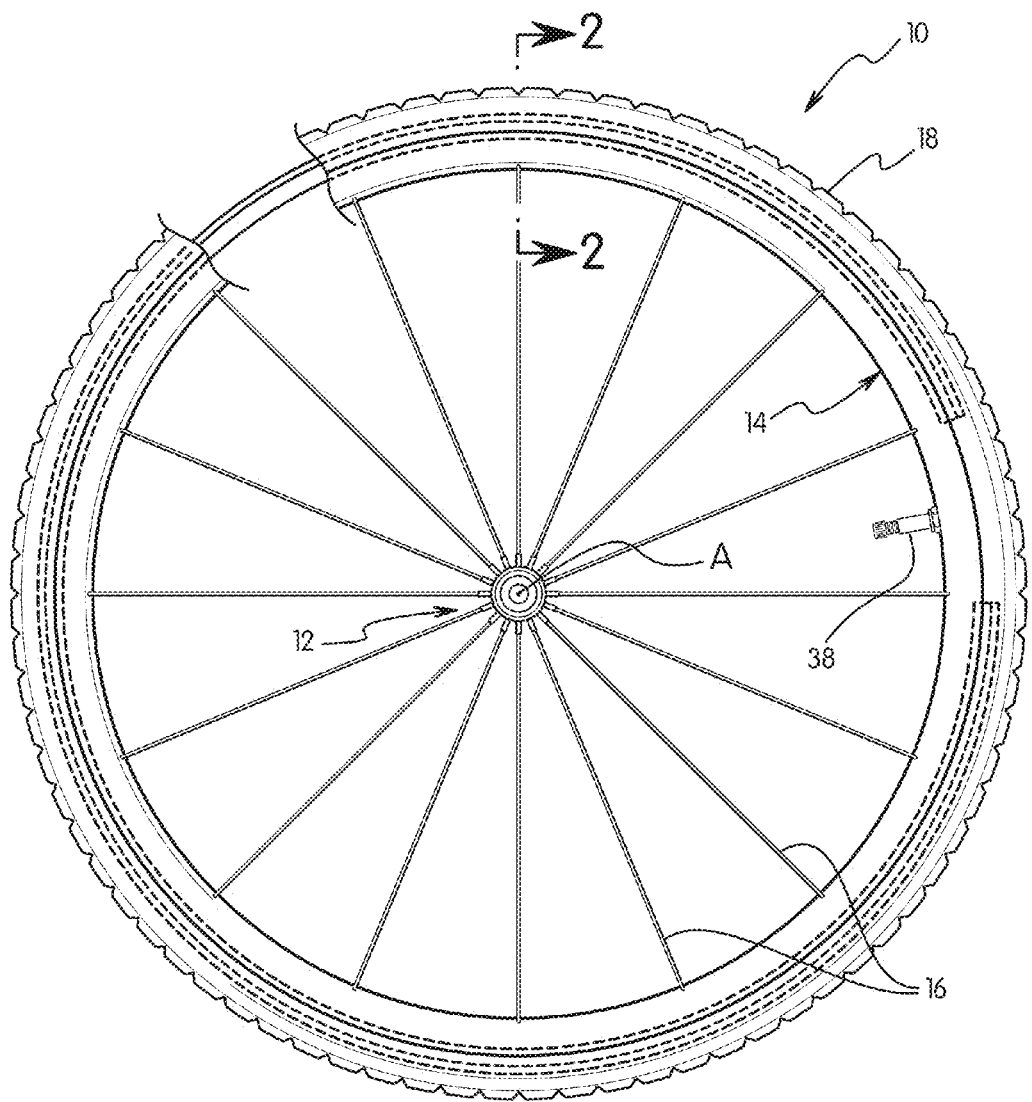
FIG. 1 is a side elevational view of a front bicycle wheel that includes a tire retainer in accordance with a first illustrated embodiment for preventing a clincher tire from disengaging from a rim, even if the tire is punctured.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents. Thus, this invention may, however, be embodied in many different forms and should not be construed as limited to the embodiments set forth herein. Rather, these embodiments are provided so that this disclosure will be thorough and complete, and will fully convey the scope of the invention to those skilled in the art. Also like reference numerals refer to like elements throughout.

Referring initially to FIG. 1, a tensioned spoke bicycle wheel 10 is illustrated in accordance with a first illustrated embodiment. The bicycle wheel 10 basically includes a center hub 12, a wheel rim 14, a plurality of spokes 16 and a pneumatic clincher tire 18. A tire retainer 20 is installed in the bicycle wheel 10 for preventing the clincher tire from disengaging from a rim, even if the tire is punctured. The hub 12 is connected to the rim 14 by the spokes 16, which are placed under tension. The clincher tire 18 is attached to the outer periphery of the rim 14. Thus, the bicycle wheel 10 rotates about a center rotational axis A of the hub 12. The hub 12, the rim 14, the spokes 16 and the tire 18 are conventional parts, and thus, the hub 12, the spokes 16 and the tire 18 will only be briefly explained herein. The bicycle wheel 10 is a clincher tire wheel in which that an air tight chamber is formed between the outer surface of the rim 14 and the pneumatic tire 118. Of course, it will be apparent to those skilled in the art from this disclosure that the rim 14 can be adapted to a tubeless tire wheel as needed and/or desired.

In the illustrated embodiment, the spokes 16 are radial tension spokes that connect the hub 12 to the rim 14. For example, eight of the spokes 16 extend to one side of the hub 12, while the other eight spokes 16 extend to the other side of the hub 12, as explained below. In the illustrated embodiment, the hub 12 is a front hub (i.e. the hub 12 does not include one or more sprockets) that utilizes sixteen radial spokes 16 coupled to the rim 14 at equally spaced circumferential locations as seen in FIG. 1. Of course, it will be apparent to those skilled in the art from this disclosure that the rim 14 could use be modified to accommodate different spoking arrangements (e.g. all tangential spokes, some tangential spokes and some radial spokes, etc.) without departing from the scope of the present invention. Also, it will also be apparent to those skilled in the art from this disclosure that the rim 14 could use be modified to accommodate fewer or more sixteen spokes if needed and/or desired. In any case, the spokes 16 are preferably coupled to the annular rim 14 in a circumferentially spaced arrangement.

Figure 2:
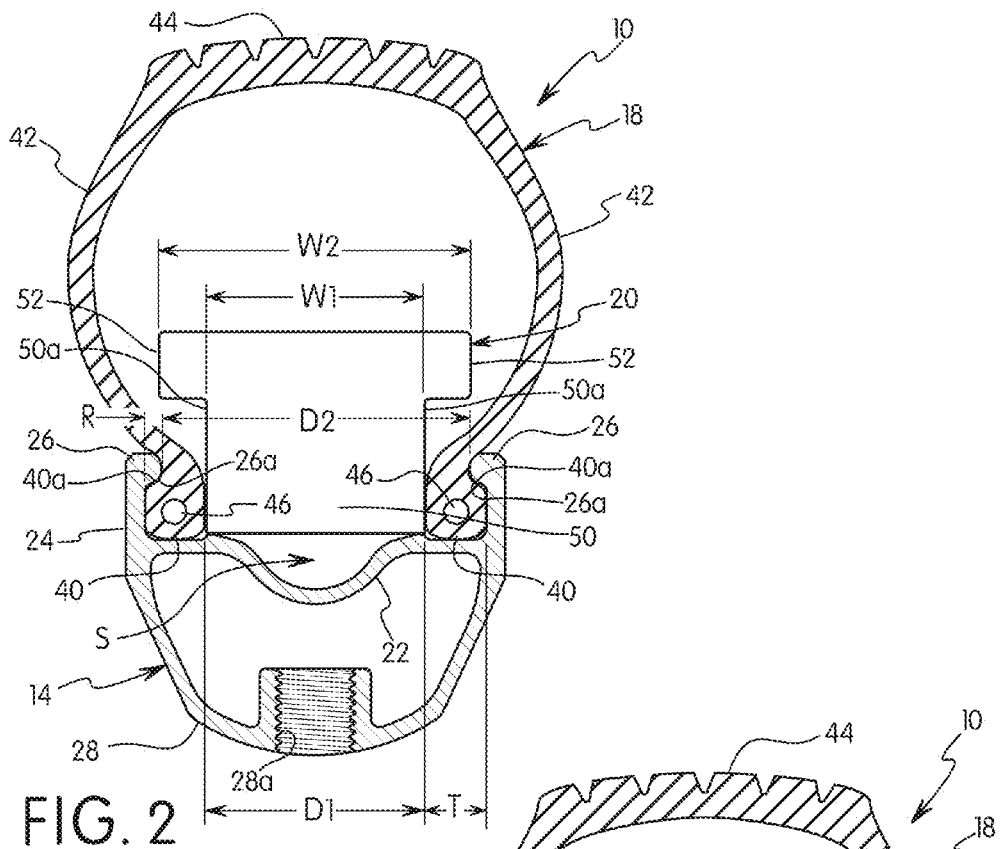
FIG. 2 is an enlarged, simplified transverse cross sectional view of a portion of the bicycle wheel illustrated in FIG. 1 as seen along section line 2-2 in FIG. 1 with the tire retainer being dimensioned to contact the tire beads.

As seen in FIGS. 1 and 2, the rim 14 is an annular member that is designed for rotation about a center rotational axis A. The rim 14 is typically a metal extrusion that is butted into its self to form a hoop. However, the rim 14 can be constructed of a wide variety of substantially rigid material, such as those materials that are well known in the art. For example, the rim 14 can be constructed of any suitable metallic material, such as plated steel, stainless steel, aluminum, magnesium or titanium, as well as other non-metallic materials, such as a carbon fiber composite. Preferably, the rim 14 is constructed of an aluminum alloy. However, the rim 14 can also be a composite structure in which an aerodynamic carbon hoop bonded to an aluminum rim.

The construction of the clincher rim 14 will now be discussed in more detail. Referring to FIGS. 1 to 5, the rim 14 is substantially circular as seen in side elevation (FIG. 1). The rim 14 basically includes an annular bridge 22 and a pair of annular flanges 24 extending outward from the annular bridge 22 to define an annular tire receiving space S. Each of the annular flanges 24 has a tire retaining ridge 26 for retaining the tire 18. The annular flanges 24 and the tire retaining ridges 26 are configured and arranged to engage and retain the tire 18 thereto in an airtight manner. The tire retaining ridges 26 are located at the free ends of the annular flanges 24, and extend axially towards each other to form a pair of annular retaining abutments 26a. The annular bridge 22 is free of any openings communicating with the interior space, except for an air filler valve opening 32 (see FIG. 4) and a tire retainer access hole 34. The tire retainer access hole 34 allows a person to insert a tool into the rim 14 to move the tire retainer 20 outward in a radial direction during a tire removal process. The tire retainer access hole 34 is sealed with a plug 36 to prevent air from the tire 18 escaping therethrough. An air filler valve 38 is mounted in the air filler valve opening 32 for filling the tire 18 with air in a conventional manner.

As seen in FIG. 2, in the illustrated embodiment, the rim 14 further includes a spoke attachment part 28 that includes a plurality of threaded holes 28a for attaching the spokes 16 in a conventional manner. The spoke attachment part 28 also has a hole 28b that is aligned with the air filler valve opening 32 for receiving the air filler valve 38. Moreover, the spoke attachment part 28 also has a hole 28c that is aligned with the tire retainer access hole 34 for inserting a tool into the rim 14 to move the tire retainer 20 outward in a radial direction during a tire removal process. The annular bridge 22, the annular flanges 24 and the spoke attachment part 28 define a one-piece, unitary rim body of the rim 14 with a hollow interior space. Of course, the tire retainer 20 can be used with other types of clincher rims as needed and/or desired. For example, the tire retainer 20 can be used with carbon fiber clincher rims.

The tire 18 includes a pair of annular bead portions 40, a pair of sidewall portions 42 and a tread portion 44. The bead portions 40 are shaped to form an annular abutment 40a that fits under the corresponding one of the retaining abutments 26a. Preferably, each of the bead portions 40 includes a wire or Kevlar fiber cord 46 such that the bead portions 40 interlock with the annular flanges 24. The bead portions 40 are engaged with the tire retaining ridges 26 of the rim 14, respectively, when the tire 18 is properly installed on the rim 14 and inflated. The tire 18 is a conventional clincher tire in which the bead portions 40 mate with the annular flanges 24 and the tire retaining ridges 26 to retain and seal the tire 18 to the rim 14. Each of the bead portions 40 has an axial thickness T.

As seen in FIGS. 2 to 6, the tire retainer 20 is a one-piece, unitary member that includes a support body 50 and a pair of outer protrusions 52 that defines an outer flange of the tire retainer 20. The tire retainer 20 is a non-annular member that preferably has a uniform transverse cross section. In this first embodiment, the tire retainer 20 has a generally T-shaped transverse cross section. The outer protrusions 52 extend along a radial outer part of the support body 50 of the tire retainer 20, and projects in opposite axially directions with respect to the support body 50. The outer protrusions 52 are radially outwardly disposed with respect to an outer periphery of the rim 14, while the support body 50 is at least partially disposed in the annular space S of the rim 14. The tire retainer 20 is a non-annular member that preferably has a uniform transverse cross section. Preferably, the tire retainer 20 has a generally C-shape, and is made of a resilient material such as a rigid elastomeric material that retains its shape. Preferably, the material of the tire retainer 20 is slightly compressible or substantially incompressible, but resiliently deformable such that the tire retainer 20 can be bent to be installed inside the rim 14 and the tire 18, and then removed and reinstalled several times. For example, the tire retainer 20 is manufactured of a resiliently deformable, elastomeric material, such as a polyurethane material, having a hardness in the range of about a 60 Shore A durometer hardness (e.g., Automotive tire tread) to about a 90 Shore A durometer hardness e.g., skateboard wheels). Of course, the hardness of the tire retainer 20 can outside of this range if needed and/or desired.

The support body 50 has an outer axial width W1, while the outer flange defined by the outer protrusions 52 has an outer axial width W2. The axial width W2 of the outer flange defined by the outer protrusions 52 is larger than the axial width W1 of the support body 50. Also the axial width W2 of the outer flange defined by the outer protrusions 52 is larger than an inner axial distance D1 between the bead portions 40 of the tire 18, while the bead portions 40 of the tire 18 are disposed within the annular space S and engaged with the tire retaining ridges 26. Moreover, the axial width W2 of the outer flange defined by the outer protrusions 52 is preferably equal to or larger than an inner axial distance D2 between the tire retaining ridges 26 of the rim 14, while the bead portions 40 of the tire 18 are disposed within the annular space S and engaged with the tire retaining ridges 26.

Figure 3:
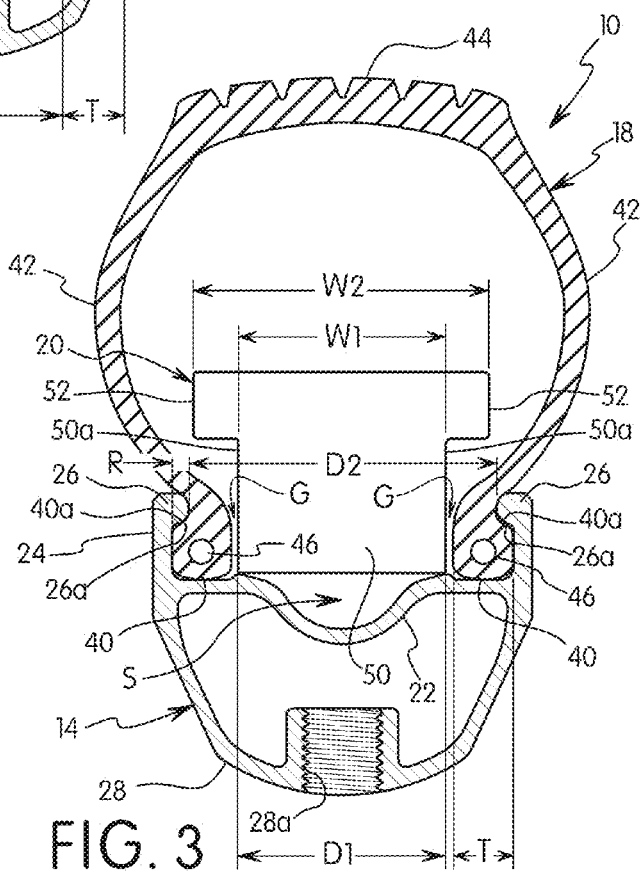
FIG. 3 is an enlarged, simplified transverse cross sectional view, similar to FIG. 2, of a portion of the bicycle wheel illustrated in FIG. 1 with an alternative tire retainer being dimensioned to with a slight gap between the tire retainer and the tire beads.
Figure 2A:
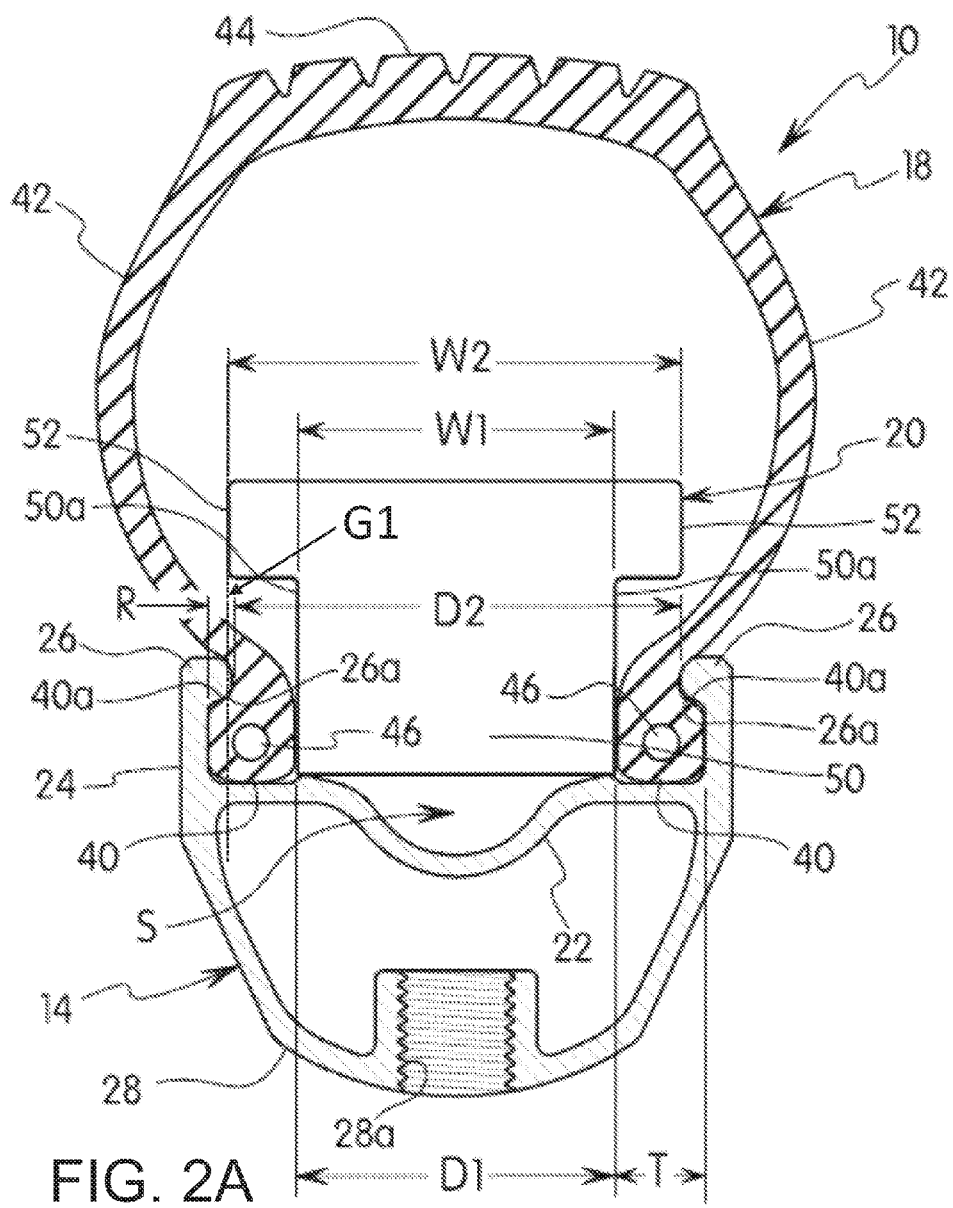
FIG. 2A is an enlarged, simplified transverse cross sectional view, similar to FIG. 2 of the portion of the bicycle wheel illustrated in FIG. 1 as seen along section line 2-2 in FIG. 1 with the tire retainer being dimensioned to contact the tire beads and annotated to show the axial width of the outer flange being larger than the inner axial distance between the tire retaining ridges.
Figure 4:
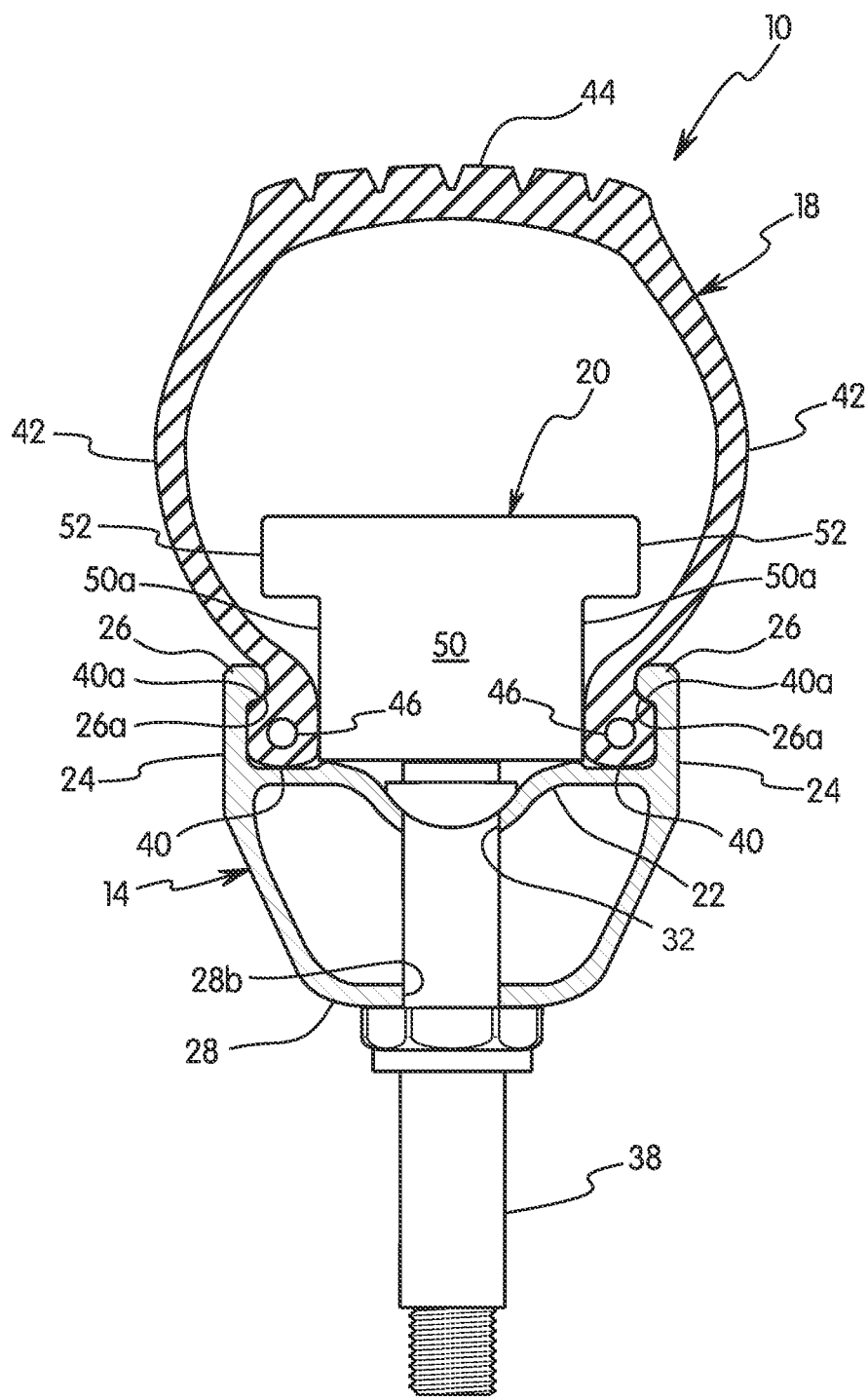
FIG. 4 is an enlarged, simplified transverse cross sectional view of a portion of the bicycle wheel illustrated in FIG. 1 as seen along section line 4-4 in FIG. 1 with the tire retainer being dimensioned to contact the tire beads.
Figure 5:
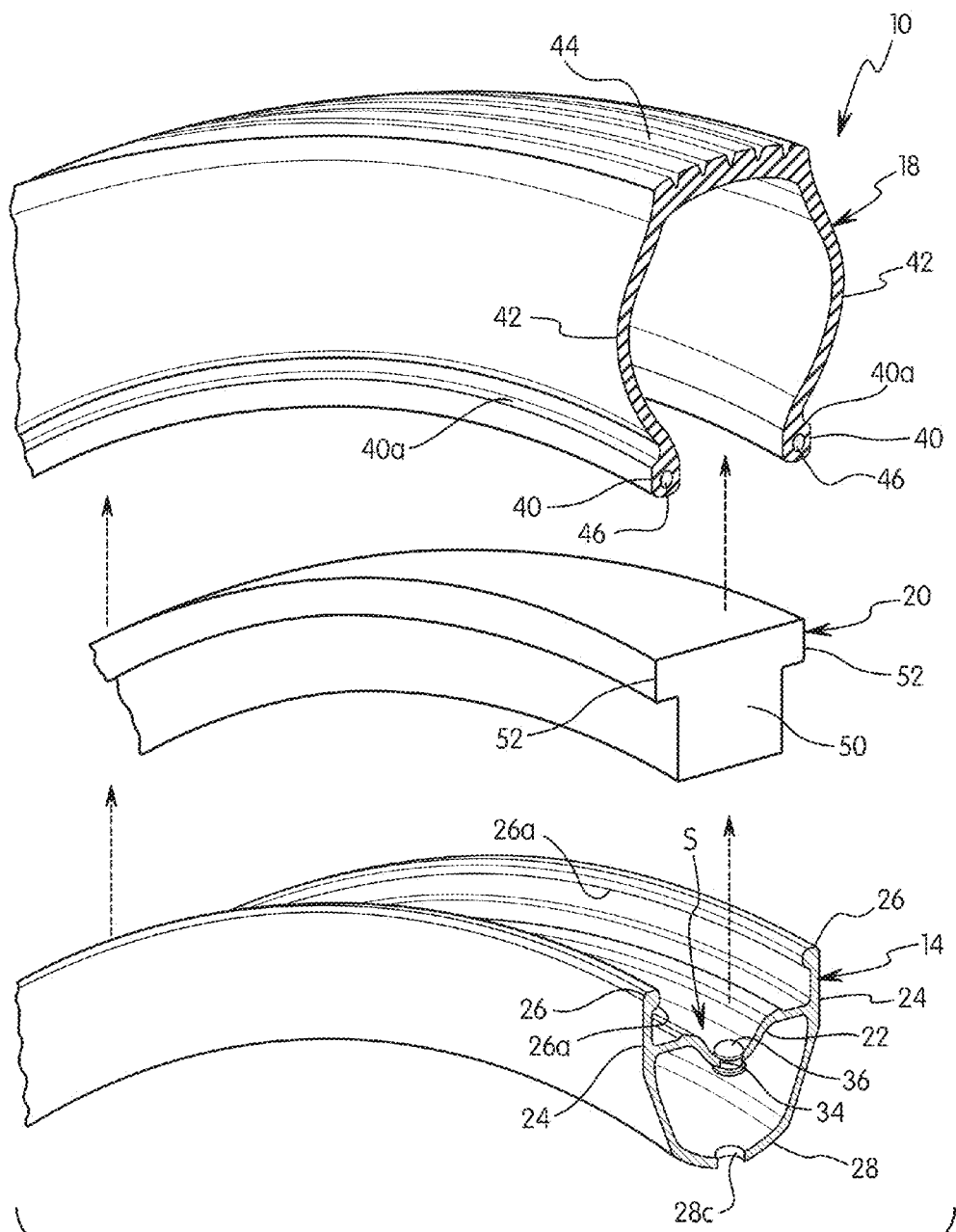
FIG. 5 is an exploded, partial perspective view of the bicycle wheel illustrated in FIG. 1.

As seen in FIGS. 2 and 3, the relative dimensions of the annular flanges 24, the bead portions 40 and the support body 50 are preferably configured such that opposite sides 50a of the support body 50 either contact or are slightly spaced from the bead portions 40. FIG. 2 illustrates the situation in which the opposite side faces 50a of the support body 50 of the tire retainer 20 contacts the bead portions 40 of the tire 18, respectively, while the tire retaining ridges 26 of the rim 14 and the bead portions 40 of the tire 18 are fully engaged with each other. FIG. 3 illustrates the situation in which the opposite side faces 50a of the support body 50 of the tire retainer 20 are slightly spaced from the bead portions 40 of the tire 18 by a gap G, respectively, while the tire retaining ridges 26 of the rim 14 and the bead portions 40 of the tire 18 are fully engaged with each other. Of course, the support body 50 of the tire retainer 20 may be shifted axially such that only one of the side faces 50a is axially spaced apart from corresponding one of the bead portions 40 of the tire 18, while the tire retaining ridges 26 of the rim 14 and the bead portions 40 of the tire 18 are fully engaged with each other.

In any case, the support body 50 has the outer axial width W1 with respect to an inner axial distance D1 between the bead portions 40 and an inner axial distance D2 between the tire retaining ridges 26 such that the bead portions 40 of the tire 18 cannot squeeze between the tire retaining ridges 26 and the support body 50. In other words, the axial width W1 of the support body 50 is dimensioned relative to the axial distance D1 between the head portions 40 of the tire 18 and the axial distance D2 between the tire retaining ridges 26 of the rim 14 such that the bead portions 40 of the tire 18 are prevented from disengaging from the tire retaining ridges 26 of the rim 14, respectively, while the tire 18 is disposed in the annular space S. Thus, the sum of the axial thicknesses T of the bead portions 40 is greater than a difference between the axial distance D2 between the tire retaining ridges 26 and the axial width of the support body 50 (i.e., 2T>D2−W1).

In the situation of FIG. 3 where the side faces 50a are slightly spaced from the bead portions 40 by the gaps G, the tire retainer 20 could shift axially such that one of the side faces 50a contacts one the bead portions 40 and the other of the side faces 50a is spaced from the other of the bead portions 40. The sum of the axial dimensions of the gaps G defines an axial spacing between the side faces 50a of the support body 50 of the tire retainer 20 and the bead portion of the tire 18. In other words, the term "axial spacing" as used with respect to the gaps G refers to a total amount clearance between the support body 50 and the bead portions 40. The axial spacing (e.g., total clearance−sum of the axial dimensions of the gaps G) has an axial width that is smaller than an axial width of one of annular retaining interfaces R formed between of the retaining abutments 26a of the tire retaining ridges 26 and the annular abutments 40a of the bead portions 40, respectively, while the tire retaining ridges 26 and the bead portions 40 are fully engaged with each other. Preferably, the axial width of the axial spacing (e.g., total clearance) between the side faces 50a and the bead portions 40 is smaller than a half of the axial dimension of the retaining interfaces between the annular abutments 40a of tire retaining ridges 26 of the rim 14 and the retaining abutments 26a of the bead portions 40 (i.e., 2G<½ R).

Figure 6:
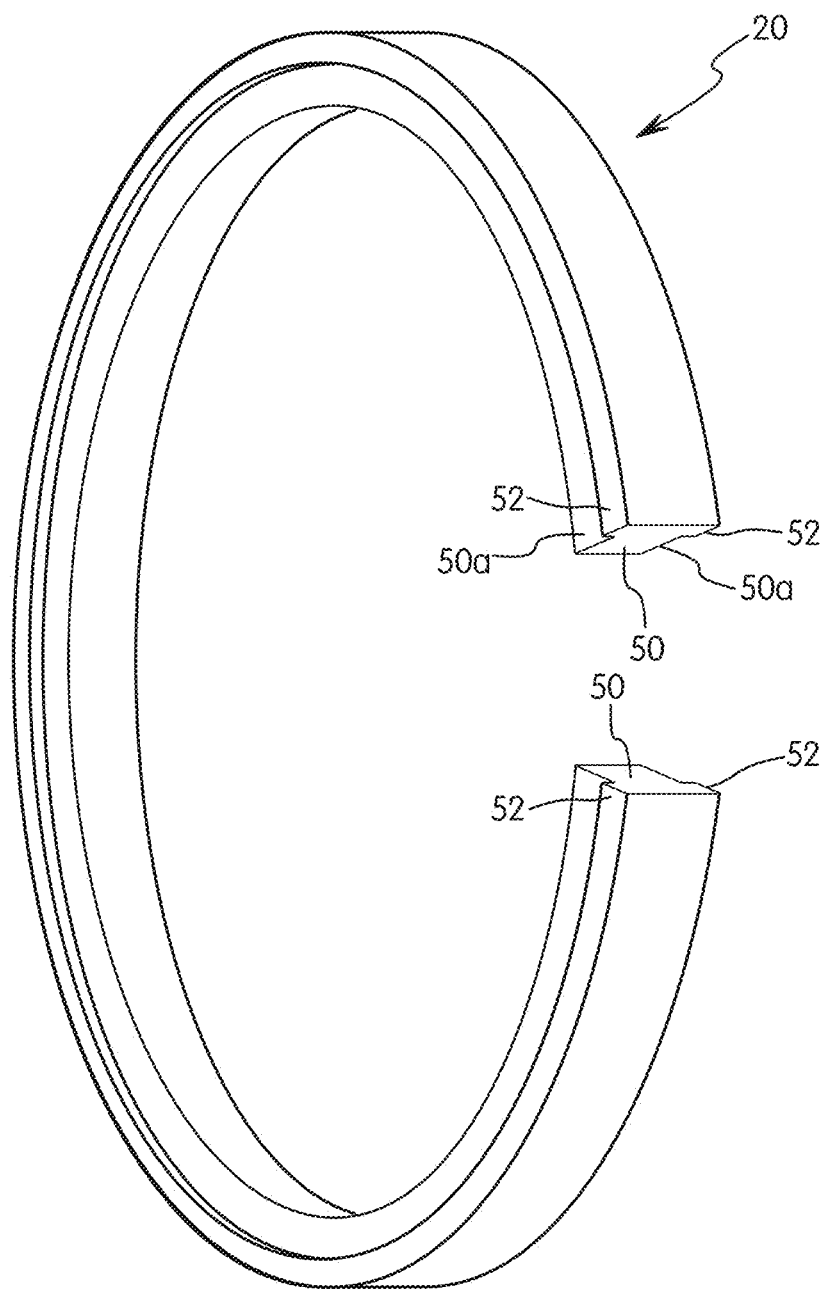
FIG. 6 is a perspective view of the tire retainer used in the bicycle wheel illustrated in FIG. 1.

In its rest (unstressed) state as seen in FIG. 6, the tire retainer 20 has an inner diameter that is preferably substantially equal to the outer diameter of the annular bridge 22. The tire retainer 20 is dimensioned to be disposed within the annular space S of the rim 14 between the tire retaining ridges 26 while the bead portions 40 of the tire 18 are disposed within the annular space S and engaged with the tire retaining ridges 26. In the situation of FIG. 2 where the side faces 50a contact the bead portions 40, friction between the side faces 50a of the support body 50 and the bead portions 40 will prevent circumferential movement of the tire retainer 20 with respect to the rim 14, while air pressure will prevent radial movement of the tire retainer 20 with respect to the rim 14. Thus, the inner diameter of the tire retainer 20 in the rest (unstressed) state can be slightly smaller or slightly larger than the outer diameter of the annular bridge 22. In the situation of FIG. 3 where the side faces 50a are slightly spaced from the bead portions 40, it is preferably it is preferably for the inner diameter of the tire retainer 20 in the rest (unstressed) state to be slightly smaller than the outer diameter of the annular bridge 22.

Figure 7:
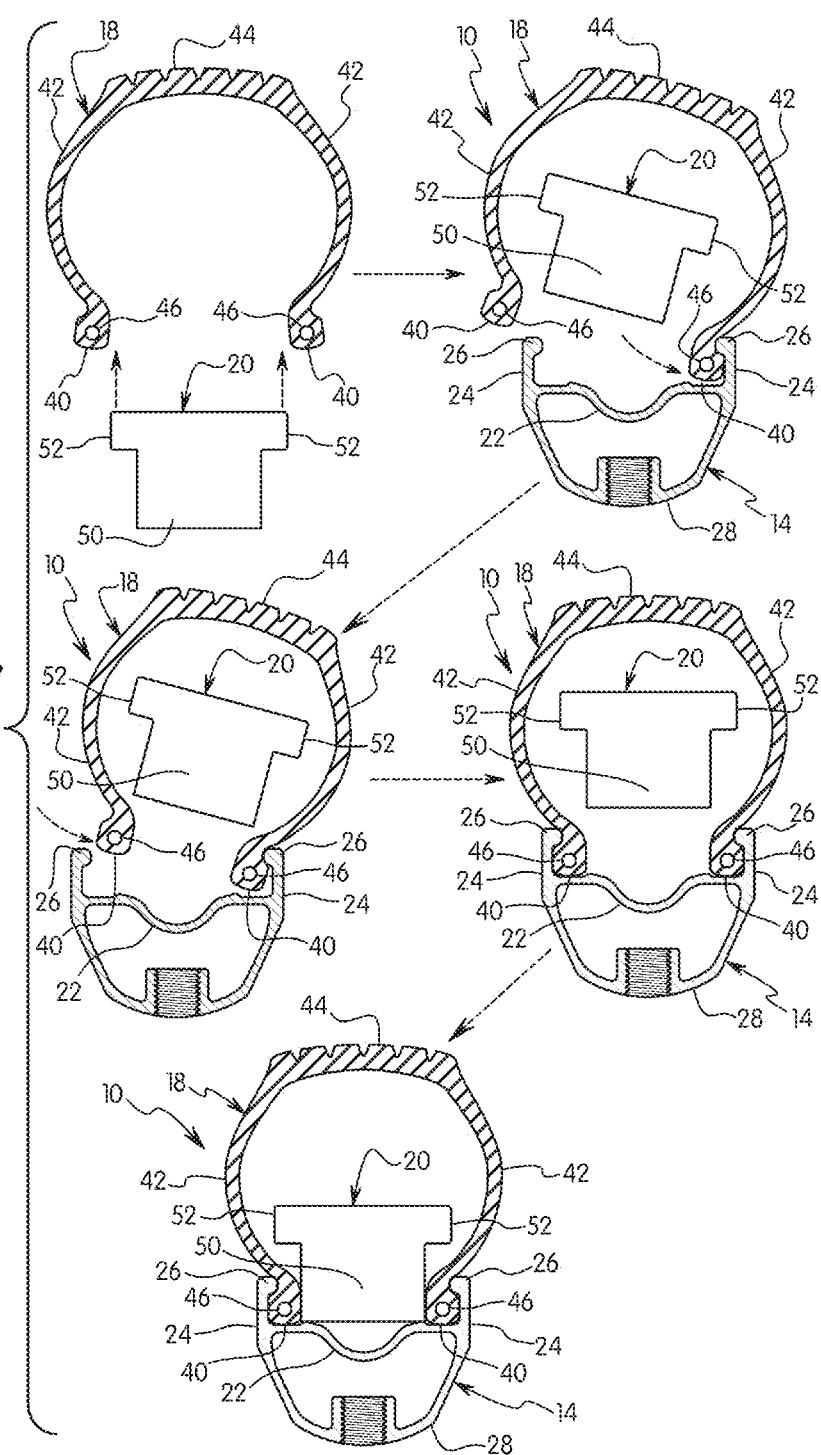
FIG. 7 is a series of simplified transverse cross sectional views of a portion of the bicycle wheel illustrating an assembly process.

Referring now to FIG. 7, one possible installation procedure of installing the tire 18 and the tire retainer 20 on the rim 14 is diagrammatically illustrated. First, the tire retainer 20 is flexed to a greater diameter and disposed inside of the tire 18. Next, one of the bead portions 40 is inserted into the annular space S and moved to engage one of the tire retaining ridges 26, while maintaining the tire retainer 20 inside of the tire 18. Then, the other of the bead portions 40 is inserted into the annular space S and moved to engage the other of the tire retaining ridges 26, while maintaining the tire retainer 20 inside of the tire 18. Now, the resiliency of the tire retainer 20 will cause the support body 50 of the tire retainer 20 to move into the annular space S between the bead portions 40 of the tire 18. Finally, the tire 18 is inflated with air via the air filler valve 38.

Figure 8:
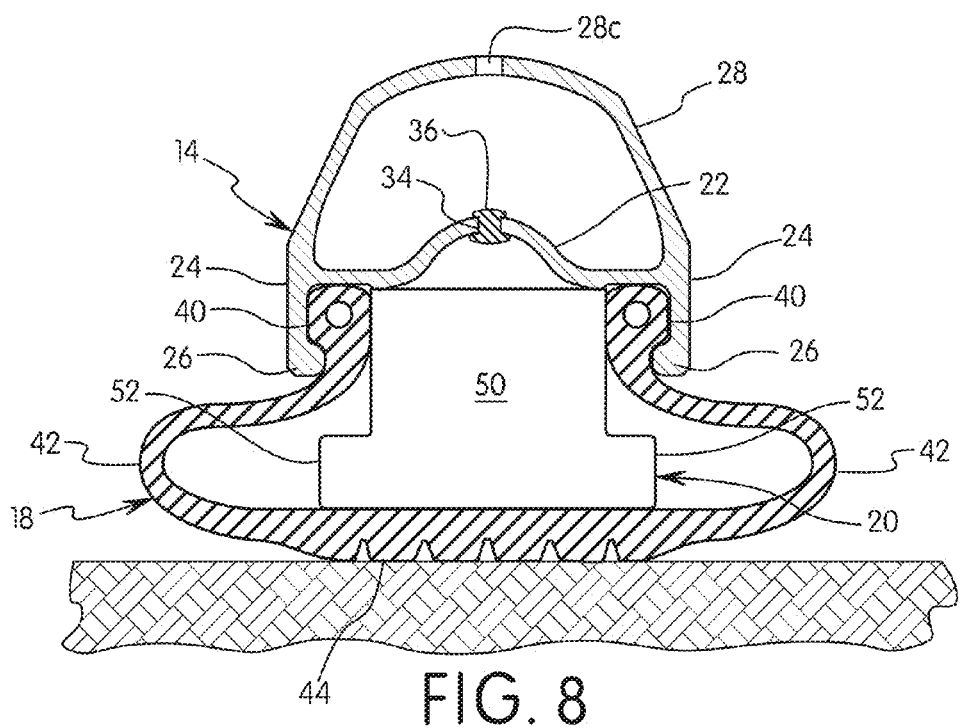
FIG. 8 is a simplified transverse cross sectional views of a portion of the bicycle wheel illustrating a situation in which the tire is punctured and contacting the ground.

Referring now to FIG. 8, a situation in which the tire 18 is punctured or loss air such that the tread portion 44 of the tire 18 is pressed against the outer protrusions 52 of the tire retainer 20. With the tire retainer 20 located in the annular space S between the bead portions 40 of the tire 18, the bead portions 40 of the tire 18 cannot be pulled out of the rim 14. Moreover, the tire retainer 20 will partially support the sidewall portions 42 of the tire 18. If the material of the tire retainer 20 is slightly compressible, then the tire retainer 20 may radially compress such that the outer protrusions 52 of the tire retainer 20 may contact the bead portions 40 of the tire 18.

When it is time to replace the tire 18 or otherwise remove the tire 18 from the rim 14, the tire retainer 20 must be moved radially outward from the annular space S. To aid in tire removal, the tire retainer access hole 34 is provided in the rim 14 to allow a person to insert a tool into the rim 14 for moving the tire retainer 20 outward in a radial direction. Once the tire retainer 20 has been moved out of the annular space 5, the tire 18 can removed in a conventional manner.

Figure 9:
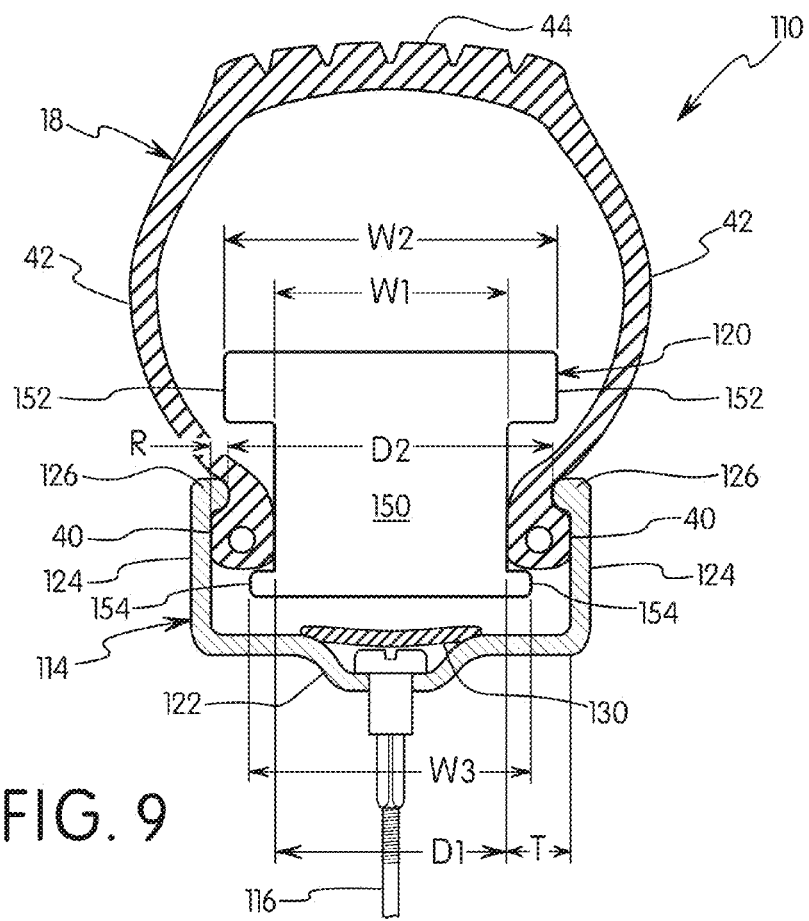
FIG. 9 is a simplified transverse cross sectional view, similar to FIG. 2, of a portion of another bicycle wheel with an alternative rim and an alternative tire retainer.

Referring now to FIG. 9, a bicycle wheel 110 will now be explained. The bicycle wheel 110 is identical to the bicycle wheel 10, discussed above, except that the rim 14 and the tire retainer 20 have been replaced with an alternate rim 114 and an alternate tire retainer 120 and conventional spokes 116 are attached to the rim 114. The rim 114 basically includes an annular bridge 122 and a pair of annular flanges 124 extending outward from the annular bridge 122 to define the annular tire receiving space S similar to the first embodiment. Each of the annular flanges 124 includes an annular ridge 126. The only difference between the rim 114 and the rim 14 is that in the rim 114, the spokes 116 are directly attached to the annular bridge 122 and the radially dimension of the annular flanges 124 has been increased. An annular seal 130 is provided over the spoke attachment openings in the annular bridge 122 to seal the annular bridge 122. The tire retainer 120 is a one-piece, unitary member that includes a support body 150, a pair of outer protrusions 152 defining an outer flange and a pair of inner protrusions 154 defining an inner flange. The only difference between the tire retainer 120 and the tire retainer 20 is that the inner protrusions 154 have been added to the support body 150 in the tire retainer 120.

In this second embodiment, the tire retainer 120 has a generally I-shaped transverse cross section. The outer protrusions 152 extend along a radial outer part of the support body 150 of the tire retainer 120, and projects in opposite axially directions with respect to the support body 150. The inner protrusions 154 are radially inwardly disposed with respect to the outer periphery of the rim 114, while the support body 150 is at least partially disposed in the annular space S of the rim 114. The inner protrusions 154 of the tire retainer 120 are radially engaged with an inner periphery of the bead portions 40 of the tire 18. The inner flange defined by the inner protrusions 154 of the tire retainer 120 has an axial width W3 that is larger than the axial width W1 of the support body 150 of the tire retainer 120. The axial width W3 of the inner flange defined by the inner protrusions 154 of the tire retainer 120 is larger than the inner axial distance D1 between the bead portions 40 of the tire 18, while the bead portions 40 of the tire 18 are disposed within the annular space S and engaged with the tire retaining ridges 126. The inner flange defined by the inner protrusions 154 of the tire retainer 20 is radially engaged with an inner periphery of the bead portions 40 of the tire 18.

Figure 10:
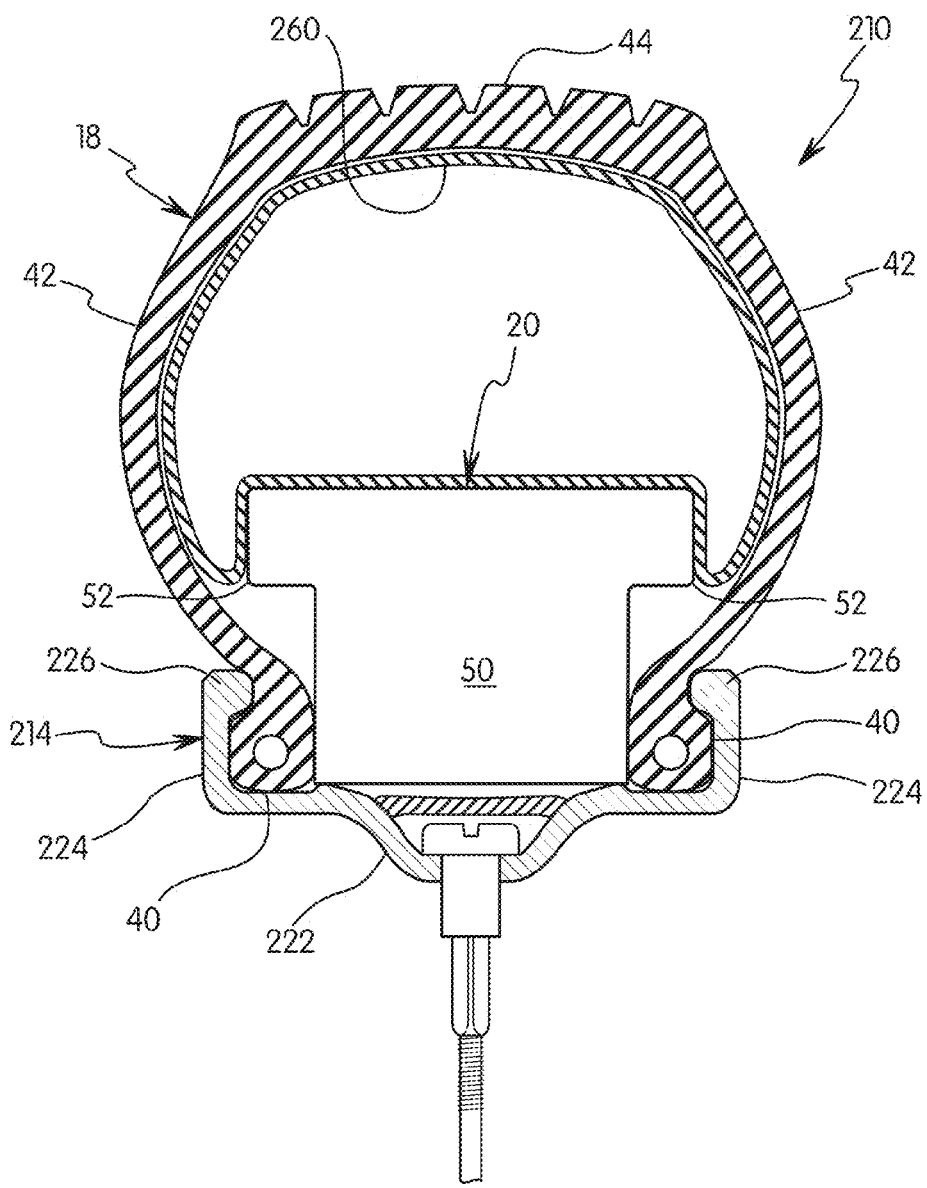
FIG. 10 is a simplified transverse cross sectional view, similar to FIG. 2, of a portion of another bicycle wheel with an alternative rim and the tire retainer of FIG. 2.

Referring now to FIG. 10, a bicycle wheel 210 will now be explained. The bicycle wheel 210 uses a modified rim 214 and the tire retainer 20 of the first embodiment. The rim 214 basically includes an annular bridge 222 and a pair of annular flanges 224 extending outward from the annular bridge 222 similar to the first embodiment. Each of the annular flanges 224 includes an annular ridge 226. However, here, an inflatable inner tube 260 is disposed within the tire 18. The enclosed space formed between the rim 214 and the tire 18 does not need to be air tight.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially change its operation. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle wheel comprising:
   a wheel rim having an annular bridge and a pair of annular flanges with tire retaining ridges, the annular flanges extending outward from the annular bridge to define an annular space;
   a bicycle tire having a pair of annular bead portions, the bead portions being engaged with the tire retaining ridges of the wheel rim, respectively; and
   a tire retainer disposed within the annular space,
   the tire retainer including two oppositely extending outer protrusions disposed radially outward with respect to an outer periphery of the wheel rim, and the outer protrusions being spaced apart from the bicycle tire in at least one of an axial direction and a radial direction while the bicycle tire is disposed in the annular space, the outer protrusions defining an outer flange having an axial width that is larger than an axial distance between the bead portions of the bicycle tire while the bead portions are engaged with the tire retaining ridges of the wheel rim, respectively,
   the tire retainer further including a support body that is disposed between the bead portions of the bicycle tire, the support body having an axial width that is dimensioned such that the bead portions of the bicycle tire are prevented from disengaging from the tire retaining ridges of the wheel rim, respectively, while the bicycle tire is disposed in the annular space, the axial width of the support body being smaller than the axial width of the outer flange of the tire retainer.

2. The bicycle wheel according to claim 1, wherein
the support body of the tire retainer has opposite side faces contacting the bead portions of the bicycle tire, respectively, while the tire retaining ridges of the wheel rim and the bead portions of the bicycle tire are fully engaged with each other.

3. The bicycle wheel according to claim 1, wherein
the support body of the tire retainer has opposite side faces, at least one of the side faces is axially spaced apart from corresponding one of the bead portions of the bicycle tire by an axial spacing while the tire retaining ridges of the wheel rim and the bead portions of the bicycle tire are fully engaged with each other.

4. A bicycle wheel comprising:
   a wheel rim having an annular bridge and a pair of annular flanges with tire retaining ridges, the annular flanges extending outward from the annular bridge to define an annular space;
   a bicycle tire having a pair of annular bead portions, the bead portions being engaged with the tire retaining ridges of the wheel rim, respectively; and
   a tire retainer disposed within the annular space, the tire retainer having a support body that is disposed between the bead portions of the bicycle tire, the support body having an axial width that is dimensioned such that the bead portions of the bicycle tire are prevented from disengaging from the tire retaining ridges of the wheel rim, respectively, while the bicycle tire is disposed in the annular space, the support body further having opposite side faces, at least one of the side faces is axially spaced apart from corresponding one of the bead portions of the bicycle tire by an axial spacing while the tire retaining ridges of the wheel rim and the bead portions of the bicycle tire are fully engaged with each other, the axial spacing between the side face of the support body of the tire retainer and the bead portion of the bicycle tire having an axial width that is smaller than an axial width of annular retaining interfaces formed between the tire retaining ridges of the wheel rim and the bead portions of the bicycle tire, respectively, while the tire retaining ridges of the wheel rim and the bead portions of the bicycle tire are fully engaged with each other.

5. The bicycle wheel according to claim 4, wherein
the axial width of the axial spacing between the side face of the support body of the tire retainer and the bead portion of the bicycle tire is smaller than a half of the axial dimension of the retaining interfaces.

6. The bicycle wheel according to claim 1, wherein
the tire retainer further includes at least one inner protrusion radially inwardly disposed with respect to the outer periphery of the wheel rim.

7. The bicycle wheel according to claim 6, wherein
the at least one inner protrusion includes two oppositely extending inner protrusions that define an inner flange.

8. The bicycle wheel according to claim 7, wherein
the inner flange of the tire retainer has an axial width that is larger than the axial width of the support body of the tire retainer.

9. The bicycle wheel according to claim 8, wherein
the axial width of the inner flange of the tire retainer is larger than the axial distance between the bead portions of the bicycle tire.

10. The bicycle wheel according to claim 6, wherein
the at least one inner protrusion of the tire retainer is radially engaged with an inner periphery of the bicycle tire.

11. The bicycle wheel according to claim 1, wherein
the tire retainer is a non-annular member.

12. The bicycle wheel according to claim 1, wherein
the tire retainer is made of resilient material.

13. The bicycle wheel according to claim 1, further comprising
an inflatable inner tube disposed within the bicycle tire.

14. The bicycle wheel according to claim 1, wherein
the annular space in which the tire retainer is disposed is a single continuous space that extends substantially around an entire circumference of the wheel rim.

* * * * *